United States Patent [19]

Nemschoff et al.

[11] Patent Number: 4,830,435
[45] Date of Patent: May 16, 1989

[54] SEATING UNIT HAVING A SEAT SUBASSEMBLY SECURED THEREON

[75] Inventors: Leonard M. Nemschoff; Mark S. Nemschoff, both of Sheboygan, Wis.

[73] Assignee: Nemschoff Chairs, Inc., Sheboygan, Wis.

[21] Appl. No.: 65,041

[22] Filed: Jun. 22, 1987

[51] Int. Cl.[4] .............................................. A47C 4/02
[52] U.S. Cl. .................................... 297/440; 297/443; 297/444; 403/246; 403/382
[58] Field of Search ........................ 297/440, 442–445, 297/450, 454, 455; 403/7, 245, 246, 382

[56] References Cited

U.S. PATENT DOCUMENTS

| | | | |
|---|---|---|---|
| 2,542,931 | 2/1951 | Lightfoot | 297/445 |
| 2,979,122 | 4/1961 | Knoll | 297/445 |
| 3,455,605 | 7/1969 | Anderson | 297/445 |
| 3,556,592 | 1/1971 | Antoine | 297/444 |
| 3,625,565 | 12/1971 | Barecki | 297/450 |
| 3,989,300 | 11/1976 | Heumann | 297/440 |
| 4,307,865 | 12/1981 | MacCready | 297/313 X |
| 4,365,840 | 12/1982 | Kehl et al. | 297/444 X |

Primary Examiner—Peter R. Brown
Attorney, Agent, or Firm—James E. Nilles; Donald C. McGaughey

[57] ABSTRACT

A seating unit comprising a main support having a pair of spaced apart side supports connected by transverse cross beams and a seat subassembly, including an internal frame with back cushion and seat cushion support portions secured on the main support by a concealed mounting means. The concealed mounting means is characterized by a pair of spaced apart upper tenon mounting mortises located internally on the main support. A pair of spaced apart upper tenons are secured on the back cushion support portion and located to be positioned in the upper mortises when the seating unit is in an assembly condition. A pair of spaced apart lower tenon mounting mortises are located internally on the main support. A pair of spaced apart lower tenons are secured on the seat cushion support portion and located to be positioned on the lower tenon mounting mortises when the seating unit is it in an assembled condition. Concealed threaded fastening devices are used to secure each of the tenons in its respective mortise.

3 Claims, 4 Drawing Sheets

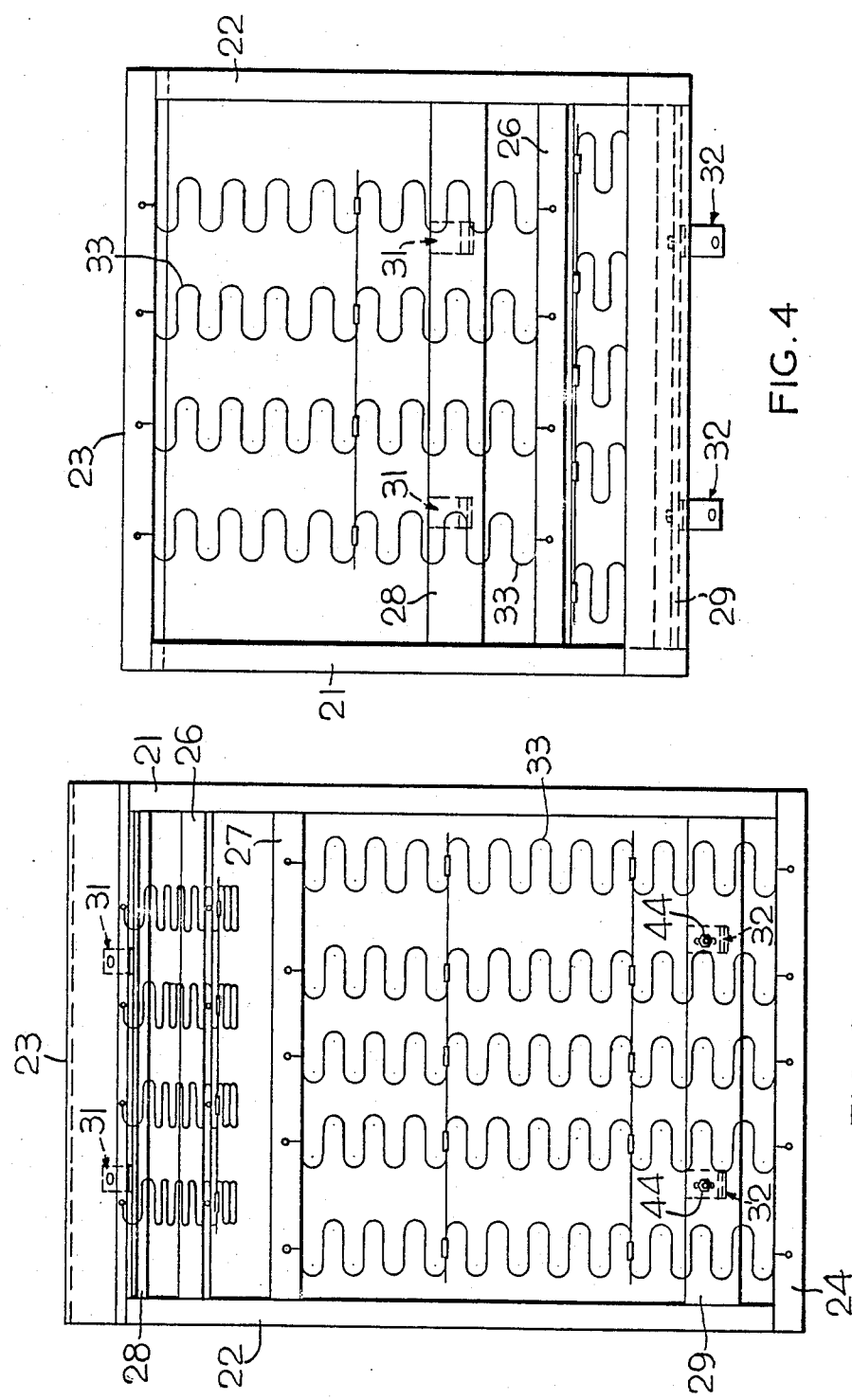

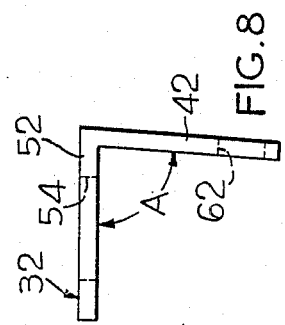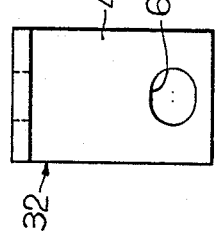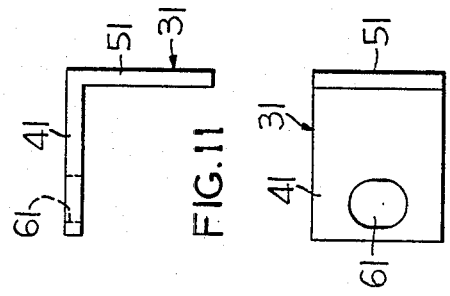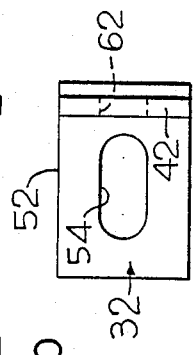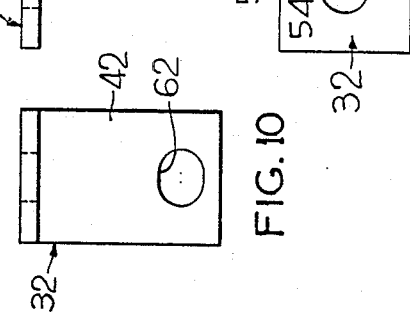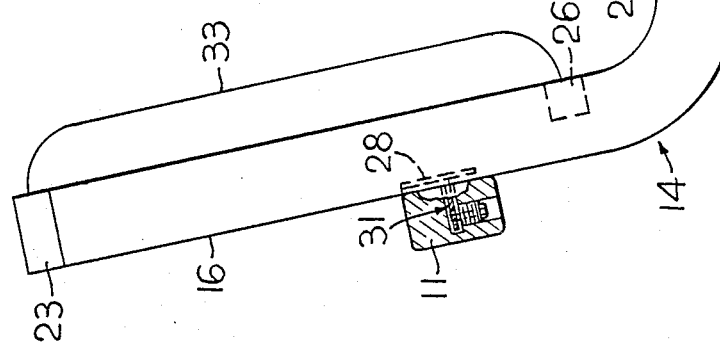

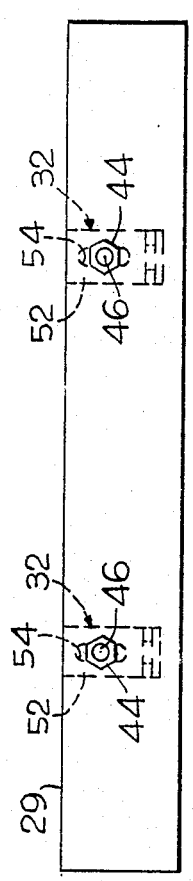
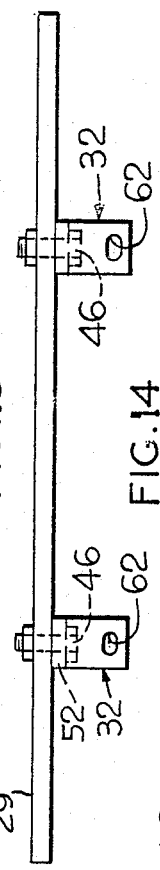
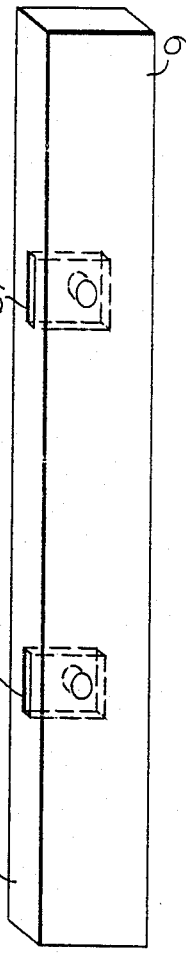
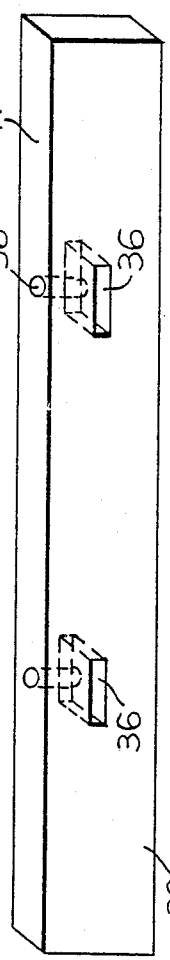
FIG.13
FIG.14
FIG.15
FIG.16
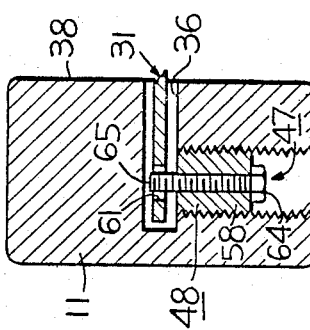
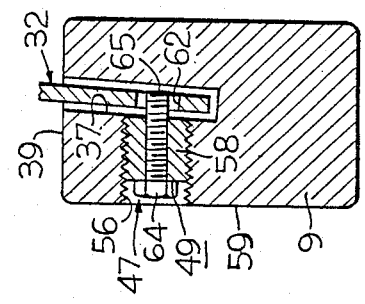
FIG.6
FIG.7

SEATING UNIT HAVING A SEAT SUBASSEMBLY SECURED THEREON

BACKGROUND OF THE INVENTION

This invention relates generally to a seating unit comprising side supports and a seat subassembly mounted thereon and is more particularly concerned with a concealed mounting for structurally integrating the seat subassembly into the seating unit.

Prior art seating units take many forms. One type of prior art seating unit generally comprises a main support structure which includes a pair of spaced opposed side support members connected together by transverse cross means. A seat subassembly is secured between the side support members. The need in such units is to provide a seating unit which will, when finally assembled, have an integrated strong structural inner frame capable of withstanding the multidirectional stresses imposed by people sitting in such units. Such units are placed in a heavy use environment, such as hospitals, psychiatric units, dormitories, hotels and other commercial establishments where the units are subject to heavy use and even abuse. If the seating unit can be made of all steel construction it is a relatively simple matter to design a seating unit that will withstand such stress and abuse.

However, the owners and operators of such establishments desire the beauty and warmth of natural hard woods, but it is difficult to design wood units that will stand such use. Thus, to provide the needed strength it has been the practice to make the highly visable main side supports out of beautiful hardwood and to provide a rigid steel frame for the upholstered back cushion and the horizontal seat cushion subassembly. The art of making concealed joints for exposed hard wood is well known and it is also well known that such joints provide points of weakness where the seating unit is likely to break when subjected to unusually high stresses imposed at unusual angles.

U.S. Pat. No. 4,488,755 issued December 18, 1984 to Leonard M. Nemschoff discloses one way of successfully integrating a steel inner frame with natural hardwood side supports in a manner that provides the seat unit with a strong structural integrity capable of withstanding all but the most unreasonably high stresses. This prior art design provides an inner frame which has some exposed metal portions. While such designs have been highly successful and well accepted by the market place because of their strength and durability, there is a class of customers, such as psychiatric hospitals that find that any exposed metal frame parts present risks and potential for the mentally disturbed to injure themselves. Thus, exposed metal parts may be unacceptable for some applications. Such customers and users demand seating units that combine the beauty of natural hard wood with an inner steel frame that is totally concealed to protect the person seated therein while also providing strength and durability. In other words such customers want a low cost chair with a custom built appearance that has industrial strength and durability. However, these customers, and particularly institutional purchasing departments, do not desire to pay the high costs that have heretofore been associated with the manufacture and assembly of such seating units.

From the foregoing it will be appreciated that there are several existing problems. Foremost is the problem of providing structural integrity between the wood frame and a seat subassembly having an inner steel frame. In addition there is the problem of how to conceal all mounting means to minimize potential for injury. Further there is the problem of how to provide a concealed mounting means that is a paragon of simplicity in order to lower manufacturin costs to a minimum while providing a rugged seating unit wherein the inner steel frame of the seat subassembly is connected in a concealed manner to reinforce the hard wood side supports and provide structural integrity to the assembled seating unit. Still further there is the problem of accomplishing the above by providing an inner steel frame seat subassembly that can be mounted on the main frame in virtually a few minutes to significantly reduce assembly costs.

A related problem is to provide a simple concealed mounting for the internal steel frame that will permit the manufacturer to quickly upholster the seat subassembly and which will permit the end user to quickly remove the upholstered seat subassembly from the side supports for reupholstering in a short time with a pre-manufactured original factory quality upholstery cover without the need to send the entire seat unit to an upholstery shop. Not only does this reduce upholstery costs but it avoids the need to take the seating unit out of service for days or weeks.

SUMMARY OF THE INVENTION

In accord with one aspect of the invention there is provided a seating unit having a main support which includes opposed side support members connected in laterally spaced relation to each other by transverse cross means. The seating unit also has a seat subassembly secured thereon which includes a rigid internal frame having back cushion and seat cushion support portions. A concealed mounting means is used to secure the seat subassembly to the main support which is characterized by a pair of spaced apart upper tenon mounting means located internally on the main support and a pair of spaced apart upper tenons secured on the back cushion support portion. The upper tenons are located to be positioned in the upper tenon mounting means when the seating unit is in an assembled condition. A pair of spaced apart lower tenon mounting means are located on the main support. A pair of spaced apart lower tenons are located on the seat cushion support portion and the lower tenons are located to be positioned on the lower tenon mounting means when the seating unit is in an assembled condition. A concealed fastening means is used to secure each of said tenons in its respective mounting means.

According to a further aspect of this invention the upper tenon mounting means comprise a pair of spaced apart upper mortises in the main support. Similarly the lower tenon mounting means comprise a pair of spaced apart lower mortises in the main support. Preferably the mortises are in a transverse cross beam which interconnect the side support members of the main support.

According to a still further aspect of this invention, and with reference to the seating unit in a normal use position, the upper tenons each extend in a generally horizontal direction from the back cushion support portion into their respective upper mortises. The mortises are blind mortises and they also extend in a horizontal direction into the upper transverse cross beam. Similarly the lower tenons each extend in a generally vertical downward direction into their respective lower mortises, which are also blind mortises extending in a vertical direction into the lower transverse cross beam.

According to a still further aspect of this invention fixed upper factering elements are secured in the main support, preferably in a bore which extends from a lower edge of the upper transverse cross member into communication with each of the upper mortises. Similarly fixed lower fastening elements are secured in the main support, preferably in a bore which extends from an inner side of the lower transverse cross member into communication with each of the lower mortises. A releasable fastening element is mounted in cooperable relation with each of the fixed fastening elements and with the tenon that is associated with the mortise adjacent the bore in which the fastening element is located. Preferably each tenon includes an aperature therethrough with which the releasable fastening element cooperates. Each of the apertures may be elongated in a direction parallel to the transverse cross beams.

Preferably the upper tenons are secured in a fixed non-adjust-able position on the back cushion support portion while the lower tenons are releasably secured on the seat cushion support portion for adjustment in a direction parallel to the side support members.

The invention also encompasses a seat subassembly for use in a seating unit comprising a rigid integrated frame having a back cushion support portion presenting a longitudinal length when in a normal use position that extends in a generally vertical direction and a seat cushion support portion having a longitudinal length extending in a generally horizontal direction. A pair of transversely spaced apart upper back clips are mounted on the back cushion support portion to extend therefrom in a generally horizontal direction and a pair of transversely spaced apart lower seat clips are mounted on the seat cushion support portion to extend therefrom in a generally vertical downward direction. Each of the clips has a fastening means thereon.

Still other features of the present invention will become apparent from the following description when considered in connection with the accompanying drawings.

BRIEF DESCRIPTION OF DRAWINGS

In the accompanying drawings which depict a preferred embodiment of the invention:

FIG. 3 is top view of the internal frame shown in FIG. 2;

FIG. 4 is a front view of the internal frame shown in FIG. 2;

FIG. 5 is a side view of the internal frame shown in FIG. 2 showing the mounting thereof on the transverse lower front and upper rear cross beams of the chair shown in FIG. 1 with the cross beams shown in section;

FIG. 6 is an enlarged sectional view of the upper rear cross beam appearing in FIG. 5;

FIG. 7 is an enlarged sectional view of the lower front cross beam appearing in FIG. 5;

FIG. 8 is a side view of a seat mounting clip;

FIG. 9 is a bottom view of the seat mounting clip shown in FIG. 8;

FIG. 10 is an end view of the seat mounting clip shown in FIG. 8;

FIG. 11 is a side view of a back mounting clip;

FIG. 12 is a bottom view of the back mounting clip shown in FIG. 11;

FIG. 13 is a plan view of a cross frame member of the internal frame with the seat mounting clips installed;

FIG. 14 is a side view of the cross frame member shown in FIG. 13;

FIG. 15 is a perspective view of the lower seat supporting cross beam; and

FIG. 16 is a perspective view of the upper seat back supporting cross beam in an inverted position.

DETAILED DESCRIPTION OF THE PREFERRED EMBODIMENT

Figure 1:
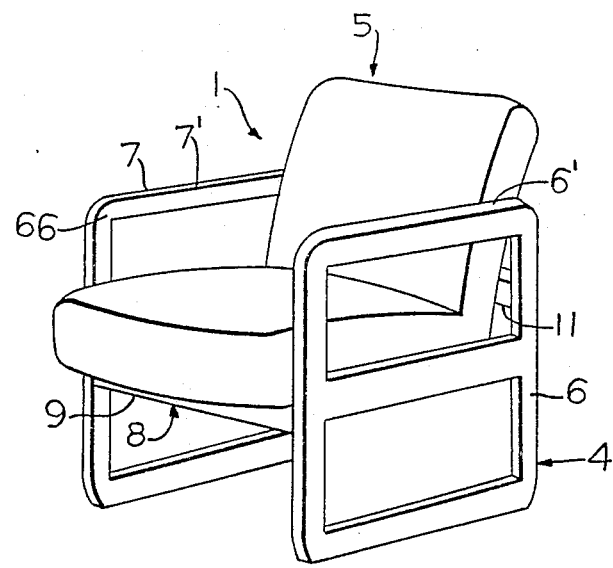
FIG. 1 is a front perspective view of a chair embodying the invention.
Figure 2:
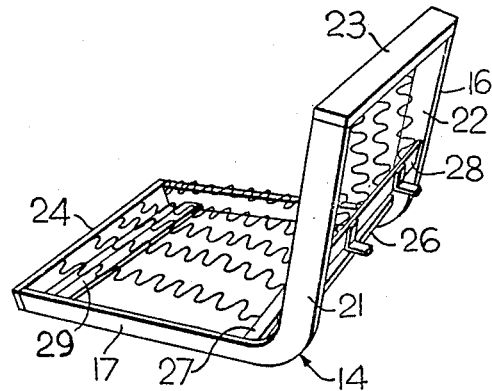
FIG. 2 is a rear perspective view of an internal frame for the chair shown in FIG. 1.

Referring to FIG. 1 the seating unit or chair 1 generally comprises a main support 4 and a seat subassembly 5 shown without upholstery thereon in FIG. 2. The main support 4 includes a pair of opposite side support members 6, 7 which are connected in spaced parallel relation to each other by sturdy transverse cross means 8 in the form of a lower front cross beam 9 and an upper rear cross beam 11. The upper edges 6' and 7' constitute the arm rests of the seating unit 1. The opposite ends of each of the lower and upper cross beams 9 and 11 are releasably but rigidly secured to the side support members in conventional manner to permit the main support 4 to be disassembled for replacement of any individual part.

The seat subassembly 5 includes a rigid unitary internal frame 14 best seen in FIGS. 2 through 5. The frame 14 has a back cushion support 16 having a longitudinal length extending in a generally vertical direction and a seat cushion support portion 17 having a longitudinal length extending in a generally horizontal direction. The internal frame 14 is constructed from a pair of L-shaped tubular side members 21 and 22 which are connected in spaced parallel relation to each other by upper rear and lower front transverse tubular members 23 and 24. A transverse back spring mounting member 26 and a transverse seat spring mounting member 27 are secured between tubular members 21 and 22. An upper transverse cross means in the form of a flat steel element 28 and a lower transverse cross means in the form of a flat steel element 29 are also secured, as by welding, between the tubular members 21 and 22. The transverse elements 28 and 29 provide a supporting structure upon which upper back clips 31 and lower seat clips 32 are mounted as will be more fully explained hereinafter.

Mounted on the internal frame 14 are a plurality of longitudinally extending seat cushion and back cushion support springs 33. The support springs provide a resilient support for the seat and back cushions and upholstered cover not shown. The upholstered cover has a zipper therein which when installed runs longitudinally rearward from a point above the front lower cross beam 9, along the bottom of the seat portion 17 and then vertically up the back cushion support portion 16. Thus the zipper originates at a point where it will be concealed by the lower front cross beam 9 and terminates at a point where it will be concealed behind the upper rear cross beam 11 so as to be tamper proof.

The concealed mounting means for securing the seat subassembly 5 on the main support 4 will now be described. The concealed mounting means, as best shown in FIGS. 6, 7, 15 and 16, includes a pair of spaced apart upper tenon mounting means in the form of internal upper mortises 36 in upper rear cross beam 11 and a pair of spaced apart lower tenon mounting means in the form of internal lower mortises 37 in the lower front cross beam 9. The upper mortises 36 are blind mortises, and with reference to the seating unit in a normal position, they extend horizontally inward from an inner side surface 38 of the upper cross beam 11. Similarly the lower mortises 37 are blind mortises extending in a vertically downward direction from an upper edge 39 of the lower front cross beam.

The concealed mounting means further includes a pair of spaced apart upper tenons 41 presented by the upper back clips 31 which are secured in a fixed nonadjustable position on the upper back cushion support portion 16 and by a pair of spaced apart lower tenons 42 presented by the lower seat clips 32 which are releasably secured on the seat cushion support portion 17 in a manner to be described, for adjustment movement in a direction which is generally parallel to the side support members 6 and 7 and also arcuate about the axis of a first fastening means which include a securing member such as cap screw 46. The upper tenons 41 extend in a generally horizontal direction from the upper back cushion support portion 16 and the lower tenons 42 extend in a generally vertical downward direction from the lower seat cushion support portion 17.

The upper back clips 31, as shown in FIGS. 11 and 12, are preferably made from angle iron and have a base 51 from which the upper tenon 41 projects at a right angle thereto. The angle iron clip bases 51 are secured by spot welding or other conventional means to upper transverse element 28. The tenon portion 41 has an aperture 61 therethrough elongated in a direction parallel to transverse element 28. The function of aperture 61 will be described hereinafter.

The lower seat clips 32 are also preferably made from angle iron and have a base 52 from which the lower tenon 42 projects at an acute angle "A" thereto to facilitate mounting subassembly 5 into the main frame 4 as will be subsequently described. The base 52 has an adjustment means which includes mounting slot 54 therethrough for receiving cap screw 46. The tenon 42 has an aperture 62 therethrough which is elongated in a direction parallel to tranverse element 29. Preferably, as best shown in FIG. 14, transversely spaced openings are provided in element 29 and transversely spaced mounting nuts 44 are welded to element 29 over the openings. The lower clips 32 are preferably adjustably secured on the element 29 by cap screws 46 threaded into the nuts 44. Loosening the cap screws 46 permits each clip 32 and its associated tenon 42 to be adjusted in directions parallel to the side support members 6 and 7 and also arcuate about the axis of cap screw 46.

The concealed mounting means also includes a fastening means 47, best shown in FIGS. 6 and 7 for securing each of the tenons 41, 42 in its respective tenon mounting means or mortise (36, 37). The fastening means includes a pair of spaced apart fixed upper fastening elements 48 secured in the main support 4, specifically in the upper rear transverse cross beam 11 and a pair of spaced apart fixed lower fastening elements 49 secured in the main support 4, specifically in the lower front cross beam 9. Each upper and lower fixed fastening element 48, 49 comprises an insert 58 mounted in a bore 56. In the upper rear cross beam 11, as best appears in FIG. 6, the bore 56 extends vertically upward from the lower edge 57 of the cross beam 11 into communication with each of the upper mortises 36. In the lower front cross beam 9, as best appears in FIG. 7, the bore 56 extends horizontally inward from an inner side 59 into communication with each of the lower mortises 37. The insert 58 is internally and externally threaded and is threaded into each bore 56 a predetermined distance. The inserts 58 have sharp knifelike external threads that make the insert self taping. The internal threads of the insert receive a releasable fastening element in the form of a conventional bolt or cap screw 64. The fastening means also includes the tenon apertures 61 and 62 which are cooperatively engaged by the releasable fastening elements 64 as will be more fully explained hereinafter.

The assembly of the seating unit will now be described. The main support 4 is assembled by releasably securing the transverse cross beams 9, 11 between side support members 6 and 7. The seat subassembly 5 is upholstered with the upper tenons 41 and 42 extending through predetermined openings in the upholstery cover not shown. The upper and lower tenons provide reference points for the upholsterer. By placing the predetermined openings in the upholstery cover over the upper and lower tenons the upholsterer immediately is assured that the upholstery cover is in the precisely correct location.

The seat subassembly 5 is placed between the side supports 6 and 7 with the upper tenons 41, 42 fully inserted in upper mortises 36. The front edge of the seat cushion 17 is lowered along an arcuate path until the lower tenons 42 are fully seated in lower mortises 37. The acute angle "A" minimizes the width of the arcuate path the tenon 42 will follow and enables the mortise 37 to be as narrow as possible. If the lower tenons 42 do not line up with the mortises 37 the cap screws 46 are loosened, the clip 32 repositioned and the cap screw retightened.

With the seat subassembly in place bolts 64 are threaded into each insert 58, with the threaded end of the bolt passing through apertures 61 or 62 in tenons 41, 42 until the head of the bolt 64 abuts the insert. Thus the insert provides a pretermined stop that prevents the installer from threading the bolts 64 in so far that the threaded end 65 would contact and split or otherwise damage the cross beam 9 or 11. The elongation of the slots 61 and 62 provides the necessary tolerance so that the bolts 64 will always align with a slot 61 or 62 when being installed.

It is to be understood that the clips 31 and 32 could take any cross sectional shape desired. Further the fastening means could take other forms. The apertures 61, 62 in the tenons could be internally threaded or provided with trapped nuts. The threaded insert 58 could be located on the opposite side of the tenon so that the bolt 64 would first pass through the tenon and then into the insert. If such a system were used the head of bolt 64 could contact tenon 41 or 42 and secure the tenon between the bolt head and insert.

To disassemble the seating unit for replacement of any part or the application of a new upholstery cover the above procedure is reversed.

A seating unit constructed according to the present invention enables the steel inner frame to reinforce the wood main frame and provide a unit that is remarkably strong, rugged, durable and long lasting. The attachment of four tenons into four transversely and longitudinally spaced mortises takes the place of the corner blocks that are usually used in the prior art to reinforce hardwood frames. A seating unit incorporating the present invention will meet the United States General Service Administration heavy duty specification and will withstand the most tortuous of tests. For example, the following tests have been applied to a seating unit, constructed according to the present invention and anchored in a fixed position:

1. The seat test. Fifty pounds of vertical force was applied to a front area of the seat followed in a rolling type sequence by 100 pounds of vertical force being applied to a rear area of the seat. This sequence of vertical forces was repeated 25,000 times to complete one test cycle. After the completion of the first test cycle the vertical forces at the front were increased by 12.5 pounds and at the rear by 25 pounds and these increased forces were applied a second 25,000 times. A total of eight such cycles were applied to the seating unit with the vertical forces being increased by 12.5 and 25 pounds respectively for each successive test cycle. It will be appreciated that during the eighth and last cycle a total of 137.5 pounds of vertical force was applied to the front portion of the frame and a total of 275 pounds of vertical force to the rear portion, each such force being applied 25,000 times. This simulates 200,000 seatings in the chair, 25,000 of which would by a person weighing 275 pounds.

2. The back test. Fifty pounds of horizontal force was applied 25,000 times horizontally against the back support portion to complete one test cycle. A total of nine test cycles were applied with the horizontal force increased by 12.5 pounds for each successive test cycle. Thus during the ninth cycle 150 pounds of horizontal force were applied to the back. This simulates 225,000 seatings against the back support portion.

3. The side support or arm rest test. The inside of the arm rest corner which is numbered 66 in FIG. 1, was hit with a horizontal force of 50 pounds directed transversely outward 25,000 times to complete one test cycle. A total of nine test cycles were applied to the arm rest corner 66 with the force being increased 12.5 pounds for each successive test cycle. Thus during the ninth cycle 150 pounds of such horizontal force were being applied to the arm rest. This simulates a seated person forcing the side supports horizontally outward a total of 225,000 times.

After all these tests a seating unit constructed according to the present invention retained its complete structual integrity with no looseness. The improved concealed mounting means uses a minimum of parts to enable the internal steel frame to reinforce the side supports in an unexpectedly strong manner and prevent wear, damage or looseness developing in the more fragile wood joints even though only two transverse side beams 9 and 11 are used to interconnect the side supports.

From the foregoing description it will be appreciated that this invention provides an unexpectedly rugged and sturdy seating unit wherein all mountings are totally concealed and wherein no parts of the inner steel frame are exposed. Further, the concealed mounting means is simple and reliable, providing low cost manufacture and high speed assembly while also permitting unskilled personnel to field service the chair at its point of end in a quick and economical manner with commonly available tools.

The foregoing specification has set forth a preferred embodiment of the invention by way of example and various modifications may be made thereto by those skilled in the art without departing from the scope of the invention.

What is claimed as the invention is:

1. A seating unit having a main support which included opposed side support members connected in laterally spaced relation to each other by transverse upper rear and lower front cross beams; and a seat subassembly which includes a rigid internal frame having a back cushion support and a seat cushion support portion secured on said main support; wherein the improvement is characterized by a concealed mounting means for securing said internal frame in a structurally integrated relationship on said main support, said concealed mounting means including:
   a pair of laterally spaced apart upper mortises located internally on said upper transverse cross beam to receive a tenon therein;
   a pair of laterally spaced upper tenons secured on said back cushion support
   said upper tenons located to be positioned in said upper mortises when said seating unit is in an assembled condition,
   a pair of latterally spaced apart lower mortises located internally on said lower transverse cross beam to receive a tenon therein,
   a pair of latterally spaced apart lower tenons, each having a base portion securable on said seat cushion support portion,
   a fastening means, including a securing member on one of said portions and an adjustment means on the other of said portions, for securing each of said lower tenons to permit adjustable movement of said lower tenon relative to said securing member parallel to said side support members so that said lower tenons can be positioned in said lower mortises when said seating unit is in an assembled condition, and
   a fastening element located internally of said upper and lower cross beams for securing each of said tenons in its respective mortise so that said mortise, tenon and fastening means are inaccessible to touch when said seating unit is assembled.

2. A seating unit having a main support which includes opposed side support members connected in laterally spaced relation to each other by upper rear and lower front cross beams, each having an inner side and upper and lower edges; and a seat subassembly which includes a rigid internal frame having a back cushion support and a seat cushion support portion, secured on said main support; wherein the improvement is characterized by
   a concealed mounting means for securing said internal frame in a structurally integrated relationship on said main support, said concealed mounting means including;
   a pair of spaced apart upper blind mortises extending generally horizontally inward from said inner side of said upper rear cross beam,
   a bore extending upward from said upper rear cross beam lower edge into communication with each on said upper mortises,
   a pair of spaced apart upper tenons secured on said back cushion support to extend horizontally outward therefrom,
   each of said upper tenons having an aperture therethrough and located to be positioned in one of said upper blind mortises when said seating unit is in an assembled condition,
   a pair of spaced apart lower blind mortises extending generally vertically downward from said upper edge of said lower front cross beam, a bore extending horizontally inward from said inner surface of said lower front cross beam into communication with each of said lower blind mortises, a pair of spaced apart lower tenons each having an aperture therethrough and a base portion securable on said seat cushion support portion, a fastening means, including a securing member on one of said portions and an adjustment means on the other of said portions, for securing each of said lower tenons to extend vertically downward from said seat cushion support portion and permit adjustable movement of said lower tenon relative to said securing member parallel to said side support members so that said lower tenon can be positioned in one of said lower blind mortises when said seating unit is in an assembled condition, a fixed internally threaded fastening element secured in each of said bores, and a releasable externally threaded fastening element mounted in cooperable relation with each of said fixed fastening elements and cooperably engaged with said aperture in its associated tenon.

3. A seat subassembly for use in a seating unit of the type having a main support which includes opposed side support members connected in laterally spaced relation to each other by transverse cross means, and a means for engaging and supporting said subassembly, said seat subassembly comprising a rigid integrated frame having a back cushion support having a longitudinal length extending in a generally vertical direction, and a seat cushion support having a longitudinal length extending in a generally horizontal direction, a pair of transversely spaced apart upper back fastening clips mounted on said back cushion support portion to extend therefrom in a generally horizontal direction so as to be engaged by said means for engaging and supporting, a pair of transversely spaced apart lower seat fastening clips each having base portion securable on said seat cushion support portion, and a fastening means, including a securing member on one of said portions and an adjustment means on the other of said portions, for securing each of said lower seat fastenig clips to said seat support portion to permit adjustable movement of said lower seat fastening clips relative to said securing member parallel to said side support members to allow alignment of said lower seat fastening clips with said means for engaging and supporting said subassembly when the seat assembly is in an installed condition.

* * * * *